Aug. 25, 1970 R. RADEBOLD 3,525,886

THERMODYNAMIC DRIVE APPARATUS

Filed Nov. 12, 1968

Inventor:
Reinhard Radebold
By: Spencer & Kaye
Attorneys

United States Patent Office
3,525,886
Patented Aug. 25, 1970

3,525,886
THERMODYNAMIC DRIVE APPARATUS
Reinhart Radebold, Berlin, Germany, assignor to Licentia Patent-Verwaltungs-G.m.b.H., Frankfurt am Main, Germany
Filed Nov. 12, 1968, Ser. No. 774,667
Claims priority, application Germany, Nov. 10, 1967, 1,601,111
Int. Cl. H02n 4/02
U.S. Cl. 310—11                                    7 Claims

ABSTRACT OF THE DISCLOSURE

Thermodynamic drive apparatus provided with a heat source, cooled expansion nozzle connected to the heat source for receiving superheated liquid working medium therefrom, and condensation means connected to the expansion nozzle. Liquid working medium is preheated by working medium formed of vapor and droplets in the expansion nozzle just before being introduced into the heat source. The preheated working medium is brought to its evaporation temperature in the heat source and delivered therefrom, as a superheated liquid, into the disintegration and acceleration nozzle. The superheated liquid is then flashed into the form of vapor and droplets and is brought during the following expansion into heat exchange relationship with liquid working medium being delivered to the heat source. By this arrangement the liquid working medium in the heat source need only absorb that heat energy required for raising its temperature to evaporation temperature.

BACKGROUND OF THE INVENTION

The present invention relates to a thermodynamic drive for a liquid having a heat source, a subsequently connected combined disintegration and expansion nozzle, a working medium formed of a liquid or of droplets and vapor, respectively, and a condensation path.

In a thermodynamic single phase drive, thermal energy is converted into kinetic energy by expansion of a gas or vapor through a nozzle. The final velocity of the working medium before condensation depends on the thermodynamic state before and after expansion. The final velocity increases with increasing thermodynamic efficiency of the acceleration process. This being so and since a high degree of efficiency is always desired, the described relatively simple type of thermodynamic drive results in a relatively high final velocity which cannot be regulated by other parameters without losses. If, on the other hand, an energy converter is connected to the described thermodynamic drive—for example an MHD (magneto-hydrodynamic) generator—the drive will achieve maximum efficiency usually at lower velocities.

In an MHD generator the velocity of the working medium must not be too high, since, otherwise, friction losses would substantially reduce the efficiency of the entire system.

In brief, therefore, the problem to which the present invention is addressed is how to bring the total efficiency of a system, having a thermodynamic drive and converter, to an optimum value. The total efficiency of the system, therefore, is the product of the thermodynamic efficiency of the thermodynamic drive apparatus and the efficiency of the converter.

In one solution to this problem, it has been proposed to expand the volume of a two-phase flow of working medium by the admixture of liquid droplets into the gaseous phase of the same material. During expansion of the gaseous phase a part of the kinetic energy is transferred to the liquid droplets so that the common final velocity of the liquid droplets with the gaseous phase of the material is less than the theoretical final velocity of the pure gaseous phase. By charging the gaseous phase of a stream of material with liquid droplets of the same material, it is possible to reduce or vary, respectively, the final velocity of the working medium. According to another and older proposal, this type of expansion of the volume of the two-phase working medium takes place in a process having a plurality of series-connected stages with the condensation of the working medium occurring in the last stage of the process. The disadvantage of this approach is that the thermodynamic efficiency of such a process is relatively poor and is substantially reduced by two types of losses.

One of these two types of losses is that due to the collision (friction) of the original fast moving two-phase stream with the admixed liquid. This type of loss is inherent to the process and cannot be avoided. To this first type of loss is added the second type of loss which loss is that due to the temperature of the admixed liquid being lower than that of the vapor and droplet (two-phase) stream.

SUMMARY OF THE INVENTION

It is an object of the present invention to provide a thermodynamic drive apparatus which furnishes a working medium having a low final velocity while at the same time substantially avoiding the losses of the above-discussed types.

In brief, the object of the present invention is accomplished by providing a thermodynamic drive apparatus comprising a heat source for heating a liquid working medium, a combined disintegration and expansion nozzle connected to the heat source for receiving the heated working medium therefrom and for changing the form of such working medium into vapor and droplets as well as for accelerating the two-phase flow, a heat exchange means associated with the expansion nozzle whereby liquid working medium being delivered to the heat source for heating enters into a heat exchange relationship with already evaporated working medium in the expansion nozzle in the form of vapor and droplets (i.e., a two-phase working medium), and a condensation means for condensing the two-phase working medium leaving the expansion nozzle.

By this arrangement, liquid working medium which is being delivered to the heat source for heating is preheated just prior to being introduced into the heat source. The liquid working medium is preheated to a point near the evaporation temperature of the working medium. This is accomplished by bringing the liquid working medum into a heat exchange relationship with the two-phase working medium which is undergoing volume expansion within the expansion nozzle of the arrangement.

The heat exchange between the liquid working medium and the two-phase working medium results in the expansion nozzle being cooled; the enthalpy of the two-phase working medium being lowered and the liquid working medium being heated to a point which will require it to absorb only that thermal energy in the heat source which is required for bringing it to its evaporation temperature. However, no evaporation will take place within the heat source.

DESCRIPTION OF THE PREFERRED EMBODIMENT

Figure 1:
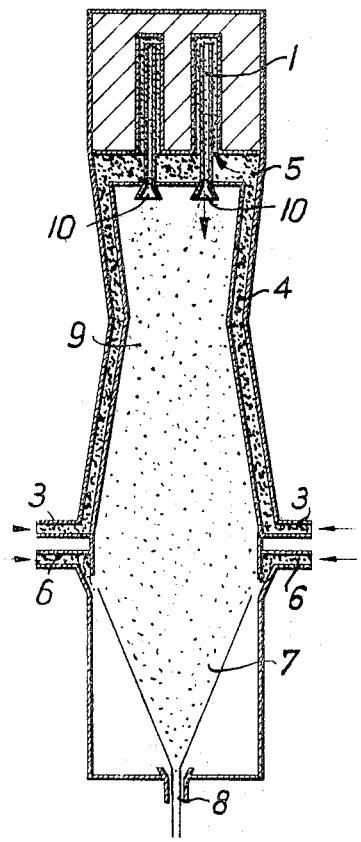
FIG. 1 is a cross sectional view of the thermodynamic drive apparatus according to the present invention.

Referring, first, to FIG. 1, where the scope of the present invention can best be understood, this shows a heat source, for example, a reactor 1 and conduits 3, which deliver liquid working medium to the heat exchange means, which includes conduits 4. The conduits 4, in turn, communicate with the reactor 1 by way of a collection chamber 5. The conduits 4 are formed inside the wall or jacket of the converging-diverging expansion nozzle 9 which is connected to the reactor 1. By this arrangement, liquid working medium is delivered by conduits 3 via the heat exchange conduits 4 and chamber 5 to the reactor 1. The preheated liquid working medium is brought to its evaporation temperature in the reactor 1 and emerges therefrom in the form of a liquid. It enters the disintegration nozzle 10, in which the pressure will be lowered. Therefore, the liquid enters a superheated state and begins to flash into a two-phase fluid.

The two-phase flow enters expansion nozzle 9 which is of the convergent-divergent type, and the working medium which is a two-phase stream of vapor and droplets will be accelerated. As shown, the two-phase stream is formed within about the first third of the length of the nozzle 10; thus, evaporation in the reactor 1, itself, is avoided.

As FIG. 1 shows, the liquid working medium, which is being delivered to reactor 1, flows through the conduits 4 in a direction opposite to that in which the working medium in the expansion nozzle 9 is flowing. In other words, the heat exchange relationship here occurs as a countercurrent process. After being preheated the liquid working medium continues to flow to the chamber or collector 5 of the reactor 1.

The two-phase working medium emerging from the expansion nozzle 9 is condensed in a condensing means in communication therewith. As can be seen, the condensing means includes conduits 6, a condensing chamber 7 and a jet outlet orifice 8. Supercooled liquid is introduced into chamber 7, for admixing with the working medium therein, via conduits 6. The vapor component of the two-phase working medium stream is caused to condense in chamber 7 by the supercooled liquid introduced therein. As a consequence of this, a pure liquid stream results and emerges from the converging orifice or jet outlet 8.

It would be particularly advantageous if beyond the jet outlet point 8 the drive apparatus according to the present invention is combined with a magneto-hydrodynamic converter.

As a result of the heat exchange relationship between the liquid working medium being delivered to the reactor 1 and the two-phase working medium in the expansion nozzle 9, a reduction in the enthalpy of the two-phase working medium stream is realized. This reduction can be measured by determining the decrease of the kinetic energy of the working medium. This decrease corresponds to the difference between the kinetic energy of the working medium in the case of isotropic expansion and its kinetic energy after the heat exchange between the liquid phase and two-phase working mediums has taken place.

The approach of the present invention results in the advantage that the efficiency of the process is improved when compared with its efficiency if there were no preheating of the liquid working medium as in the case of the Clausius-Rankine cycle.

Figure 2:
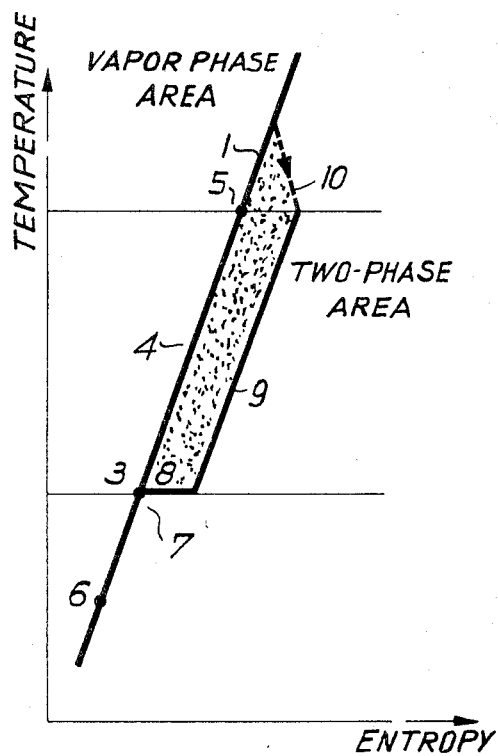
FIG. 2 is a temperature-entropy diagram which depicts the heat cycle at various stages within the apparatus according to FIG. 1.
Figure 3:
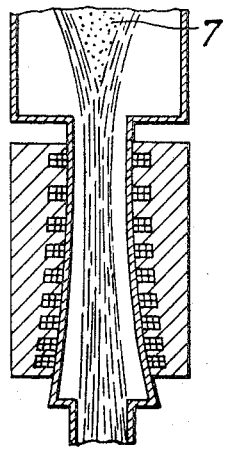
FIG. 3 is a schematic view of a thermodynamic system including a magneto-hydrodynamic converter, according to the present invention.

In effect, the approach of the present invention results in Carnotization of the Clausius-Rankine cycle. This is demonstrated by the fact that the efficiency of the process according to the present invention depends only on the upper and lower working temperatures, as in the Carnot cycle, and no longer depends on the size of the work area. This is depicted in the entropy-temperature diagram shown in FIG. 2. Inasmuch as the work area defined by the cycle shown is proportional to the square of the final velocity, and since the efficiency of the Clausius-Rankine cycle is dependent upon the size of the work area, the process according to the present invention results in a increased efficiency compared to the Clausius-Rankine cycle in spite of the desired low final velocity. It can, thus, be seen that it is possible to adjust the work area of the cycle according to the present invention by providing an initial evaporation of the working medium which would correspond to the desired final velocity. In this manner, a large mass of working medium in the form of a stream is accelerated to a low final velocity. This results advantageously in a working medium stream of great energy, but low velocity.

Referring again to FIG. 2, as can be seen, the entropy temperature diagram there shown has been labeled to correspond to various process stages of the apparatus according to FIG. 1.

With reference to the means for exchanging heat between the liquid medium and the two-phase working medium, it is particularly advantageous to provide a countercurrent type heat exchange means as shown in FIG. 1. This type of heat exchange means has proven to be very efficient. Additionally, for an efficient heat exchange relationship to be established, there must be good heat transfer between the two-phase working medium stream and the liquid working medium stream. As shown in FIG. 1, the heat transfer occurs between the two forms of the working medium through the walls of the nozzle 9. It has been found that the use of alkaline metals, for example, potassium or sodium for the working medium is particularly advantageous.

It will be understood that the above description of the present invention is susceptible to various modifications, changes and adaptations.

I claim:

1. Thermodynamic drive system in which a working medium is processed comprising, in combination:
   (a) a heat source into which the working medium is introduced as a liquid stream and heated;
   (b) a combined disintegration and expansion nozzle connected to said heat source for receiving heated liquid working medium therefrom and wherein said heated liquid working medium is expanded to form an accelerated working medium stream of vapor and droplets;
   (c) means for exchanging heat between said working medium formed of vapor and droplets and said liquid working medium prior to said liquid working medium being introduced into said heat source as a consequence of which the enthalpy of the working medium formed of vapor and droplets is reduced and the liquid working medium is heated prior to entering said heat source to near the evaporation temperature so that only that heat energy required for bringing it to its vaporization temperature is absorbed by the liquid working medium in the heat source.

2. Thermodynamic drive system as defined in claim 1 wherein said heat exchange means includes means for conveying said liquid working medium to said heat source in a direction counter to the flow of the working medium stream in the form of vapor and droplets within said expansion nozzle, said means for conveying being adjacent to said expansion nozzle.

3. Thermodynamic drive system as defined in claim 2, further comprising means for condensing said working medium formed of vapor and droplets connected to said expansion nozzle, said condensing means including a chamber for receiving said working medium formed of vapor and droplets and a conduit for introducing cold liquid into said chamber for admixing with the working medium therein.

4. Thermodynamic drive system as defined in claim 3 wherein said chamber includes a converging orifice from which emerges a jet of liquid working medium condensed in said chamber.

5. Thermodynamic drive system as defined in claim 4 wherein said working medium is formed of potassium.

6. Thermodynamic drive system as defined in claim 4 wherein said working medium is formed of sodium or rubidium.

7. Thermodynamic drive system as defined in claim 6, further comprising a magneto-hydrodynamic generator connected to said converging orifice to receive the jet of working medium therefrom.

References Cited

UNITED STATES PATENTS

| | | | |
|---|---|---|---|
| 3,293,137 | 12/1966 | Hutchinson et al. | 176—32 |
| 3,371,609 | 3/1968 | Radebold et al. | 103—1 |

DAVID X. SLINEY, Primary Examiner

U.S. Cl. X.R.

103—1